United States Patent [19]

Powell

[11] 4,370,135

[45] Jan. 25, 1983

[54] METHOD AND APPARATUS FOR MAKING DENTAL STUDY MODELS

[76] Inventor: James R. Powell, 855 Hoffman St., Elmira, N.Y. 14905

[21] Appl. No.: 203,386

[22] Filed: Oct. 31, 1980

[51] Int. Cl.³ .......................................... A61C 11/00
[52] U.S. Cl. .................................................. 433/213
[58] Field of Search .................. 433/213, 214, 34, 54, 433/72, 75

[56] References Cited

U.S. PATENT DOCUMENTS

| | | | |
|---|---|---|---|
| 1,518,075 | 12/1924 | Kesling | 433/72 |
| 2,545,249 | 3/1951 | Ackerman | 433/72 |
| 3,576,075 | 4/1971 | Scott | 433/34 |

FOREIGN PATENT DOCUMENTS 448368  5/1948  Canada ................................. 433/54

Primary Examiner—Robert Peshock
Attorney, Agent, or Firm—Harvey B. Jacobson

[57] ABSTRACT

Upper and lower plaster study models are cast in sequence from impressions held in trays positioned over the same base former having a molding cavity dimensioned close to the final trimmed shape of the base portions of the study models. Tray alignments procedures utilized during the casting operations guide positioning of the trays to enable formation of study models that require minimal trimming.

10 Claims, 8 Drawing Figures

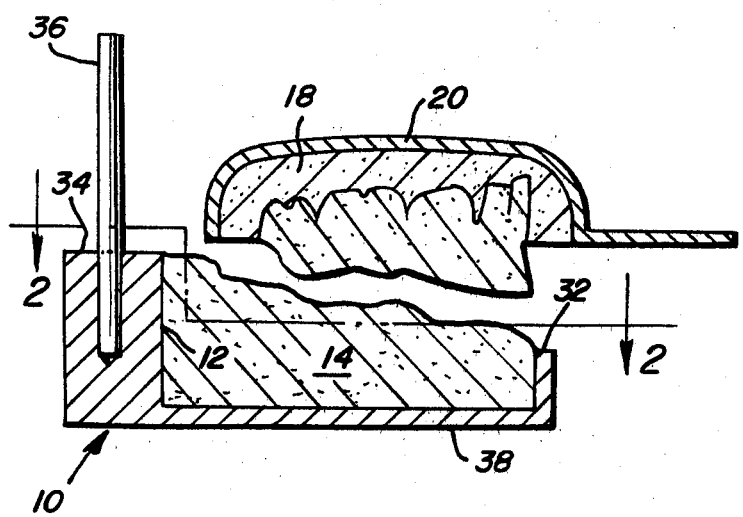
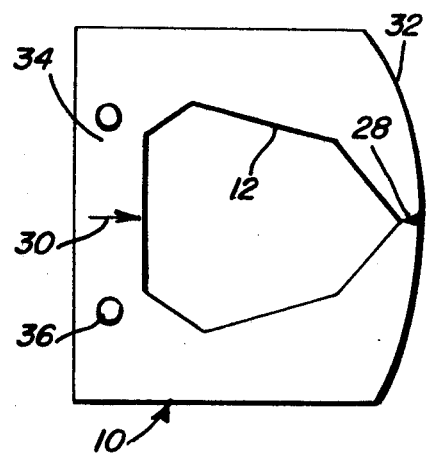
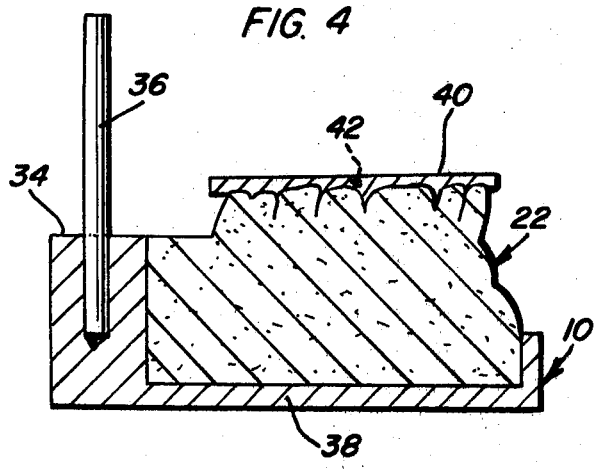
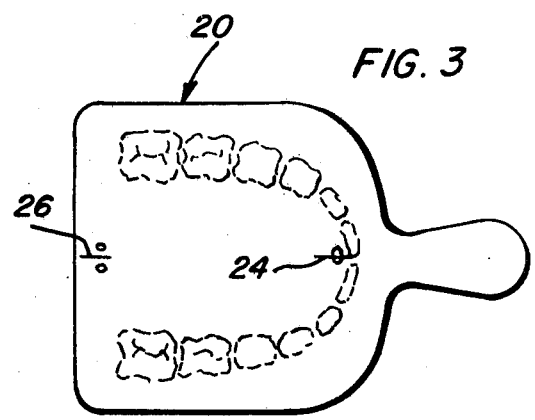
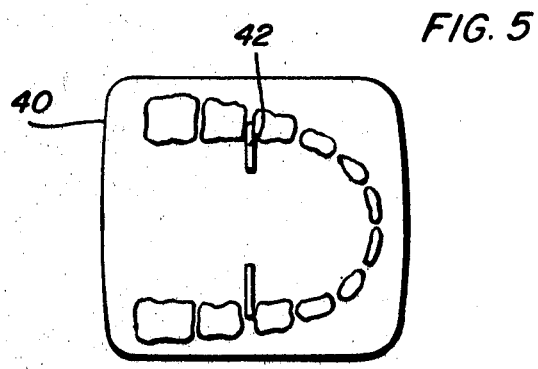

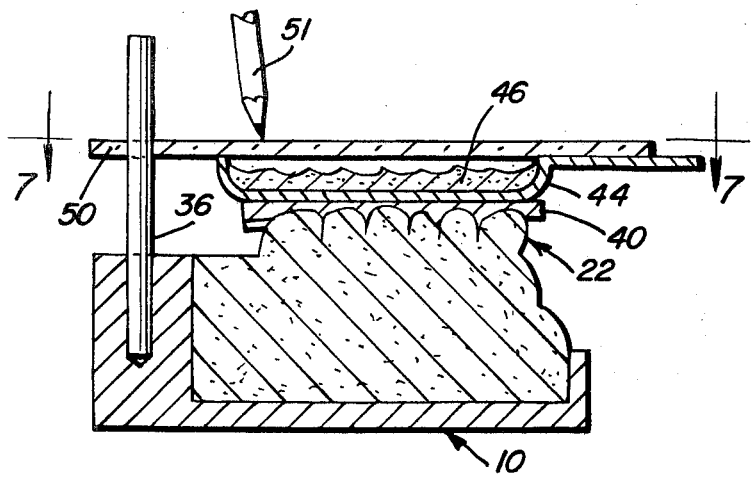
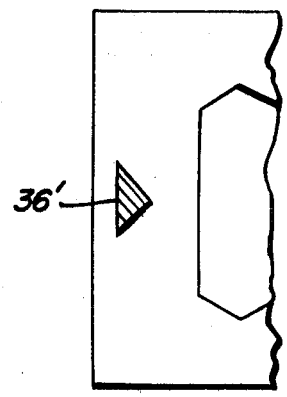
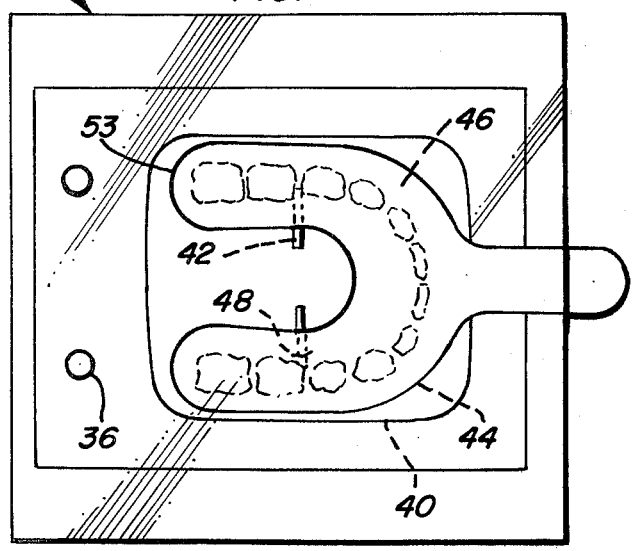
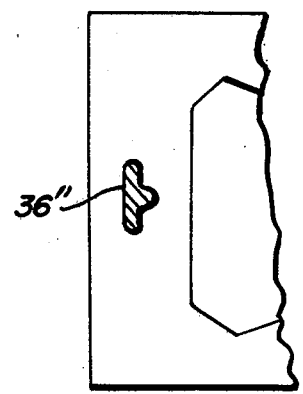
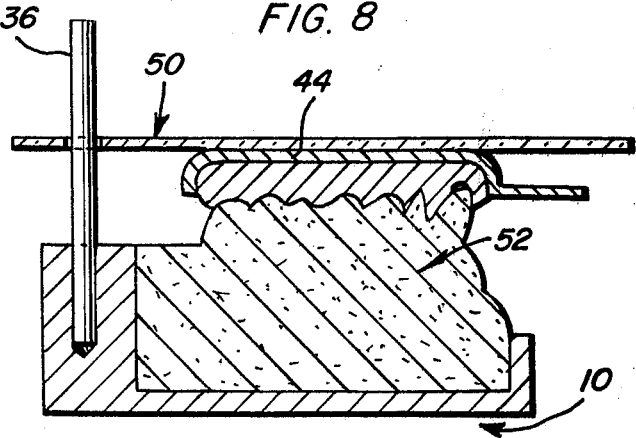

METHOD AND APPARATUS FOR MAKING DENTAL STUDY MODELS

BACKGROUND OF THE INVENTION

This invention relates to the making of dental study models by casting of plaster in maxillary and mandibular impressions.

Dental study models are generally cast by plaster deposited into the base molding cavity of a model former facing the impression side of an impression holding tray into which plaster is also placed. The two masses of wet plaster are united as the tray is positioned by the dental mechanic over the plaster filled cavity in the former resulting in a unitary hardened plaster model that is exposed upon removal from the tray and model former. Upper and lower models that are occusally related by a previously prepared wax bite, when so cast require a substantial amount of plaster trimming because the base molding cavity is made large enough to accommodate expected variations in manual positioning of the impression trays relative to the model former during the casting operations. Furthermore, since the cavity is often oval shaped and large enough to cover many mouth sizes, a considerable amount of trimming is necessary.

It is therefore an important object of the present invention to provide a method and apparatus for substantially reducing the amount of model trimming heretofore required in connection with the making of dental study models.

SUMMARY OF THE INVENTION

In accordance with the present invention occlusally related upper and lower dental study models are independently cast in sequence from maxillary and mandibular impressions utilizing the same base molding cavity which is dimensioned and shaped close to the final trimmed shape of the model base portion. Relatively precise positioning of the impression trays relative to the common model former is therefore required during the casting operations. Toward that end, the model former is provided with centering index marks to enable its central alignment with a line of symmetry established with respect to the maxillary impression. The former is also provided with at least one guide rod for mounting an alignment guide plate through which an occlusal relationship of the mandibular impression to the base molding cavity is recorded on a plane surface.

The maxillary or upper impression tray is marked in accordance with anatomical landmark locations on its impression to establish the aforementioned line of symmetry adapted to be aligned with centering index marks on the model former by adjustable positioning of the impression tray during the initial casting operation. The initially cast model is then utilized to establish the aforementioned occlusal relationship between the common base molding cavity and the other mandibular impression. A wax bite placed on the initially cast model, which is retained in the cavity of the former, has marking pins inserted therein adapted to be aligned with corresponding markings in the mandibular impression positioned by its tray on the wax bite facing away from the cavity. With the tray so positioned, its outline is traced on the planar surface of a transparent sheet in contact therewith, the sheet being mounted on the aforementioned guide rod. An occlusally aligned position of the tray is thereby recorded on the transparent sheet which may then be used as an alignment guide for subsequent positioning of the tray during the next casting operation producing the lower or mandibular study model.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

FIG. 1 is a side section view through a model former and impression tray associated with an initial casting operation in accordance with the present invention.

FIG. 2 is a top section view of the model former shown in FIG. 1 as viewed from a plane indicated by section line 2—2 in FIG. 1.

FIG. 3 is a top plan view of the impression tray shown in FIG. 1.

FIG. 4 is a side section view through an upper study model cast within the model former, with a wax bite placed thereon in accordance with one phase of the invention.

FIG. 5 is a top plan view of the wax bite shown in FIG. 4.

FIG. 6 is a side section view similar to FIG. 4, but showing a subsequent tray position recording phase of operation.

FIG. 7 is a top plan view of the apparatus shown in FIG. 6.

FIG. 8 is a side section view through the same model former as shown in FIGS. 1, 4 and 6 during a subsequent casting operation.

FIGS. 9 and 10 are partial top section views showing modifications of the model former as shown in FIG. 2.

DETAILED DESCRIPTION OF PREFERRED EMBODIMENTS

Referring now to the drawings in detail, FIG. 1 illustrates the generally well-known casting operation for an upper study model wherein a model former generally referred to by reference numeral 10 has a base molding cavity 12 formed therein adapted to receive a mass of plaster 14 in underlying relation to a mass of plaster 16 filling the cavities in impression material 18 held in an upper impression tray 20. Before the plaster has set, the two wet plaster masses 14 and 16 are brought into contact with each other so that a single unitary mass of plaster hardens into an upper dental study model 22 as shown in FIG. 4.

The impression tray 20 is of a conventional type within which impression material is deposited to obtain an impression of the upper toothed jaw of the dental patient. However, in accordance with the present invention anatomical landmarks recorded in the impression material, such as the incisive papilla and the fovea palatina, are utilized to locate alignment marks 24 and 26 on the tray 20 as shown in FIG. 3, establishing a symmetry line. The line of symmetry is adapted to be aligned with centering index marks 28 and 30 on the former 10 as shown in FIG. 2, when positioning the tray 20 over the cavity 12 during an initial model casting operation as hereinbefore described. By virtue of such an alignment procedure, the base molding cavity 12 in the former 10 may be dimensioned and shaped in horizontal cross section close to that of the ultimately trimmed base portion of the study models.

As shown in FIGS. 1 and 2, the former 10 is made of a rubber or rubber-like receptacle member having a front surface portion 32 on which the centering index mark 28 is formed and a rear surface portion 34 on which index mark 30 is formed between a pair of guide rods 36. The guide rods 36 project upwardly from surface portion 34 perpendicular to the planar bottom 38 of the receptacle member for purposes to be described hereinafter. While the horizontal cross section of the cavity 12 is dimensioned as aforementioned for minimal trimming of the base portion of the model cast therein, the vertical depth of the cavity is sufficient to accommodate any corrective positioning of the impression tray 20 in a vertical plane to align the cast tooth portion of the model with a horizontal occlusal plane.

After the upper study model 22 has hardened, the impression tray 20 is removed and a wax bite 40 previously prepared by the dentist is placed in occlusal contact with the upper study model retained in the former 10 as shown in FIG. 4. A pair of marking pins 42 are embedded in the wax bite as shown in FIG. 5, on the lingual sides between the second bicuspid and mesial surfaces of the first molar impressions in the wax. A lower impression tray 44 having an impression 46 of the lower toothed jaw held therein, is then placed on the wax bite with its impression side facing away from the cavity 12 as shown in FIG. 6. Alignment marks are formed on the lingual portion of the impression 46 as shown in FIG. 7 so that the tray 44 may be adjustably aligned in the occlusal plane of the wax bite 44 until the marks 48 overlie the marking pins 42 therebelow on the wax bite. The lower impression tray will then be in an aligned occlusal position which is recorded on an alignment guide plate 50 shown in FIG. 6.

The alignment guide plate according to one embodiment is a transparent sheet having a planar recording surface on which the outline of the tray 44 is adapted to be traced by some stylus 51 as shown in FIG. 6 in order to record the aligned position of the tray in a recording plane generally parallel to the bottom 38 of the former. A pair of holes are therefore formed in the guide plate 50 through which the guide rods slidably extend. A tracing 53 of the tray outline may thereby be made on the plate 50 positioned above the tray 44 and in contact therewith as shown in FIG. 7.

After the aligned position of the tray 44 is recorded on plate 50, the assemblage shown in FIG. 6 is disassembled and the upper study model 22 removed from the common former 10. A lower study model 52 is then cast between the former 10 and the lower impression tray 44, inverted to have its impression side face the cavity 12 during the casting operation, as shown in FIG. 8. During the latter casting operation, the lower tray 44 is adjusted vertically to underlie and contact the alignment plate 50 reassembled on the guide rods 36 over the tray 44 only after its planar faces are reversed from that of FIG. 6. The tray as shown in FIG. 8 may therefore be adjusted in the horizontal plane to its previously aligned position by alignment with the recorded outline previously traced on plate 50. Thus, the lower study model so formed will also require little trimming for its base portion.

Various known methods and means may be utilized for removable recording or tracing of the tray outline on the alignment guide plate, including appropriate ink or pencil receiving surface treatment of the planar surfaces of plate 50, or the use of removable coatings. While vertical displacement of the plate 50 may be guided by two guide rods 36 as hereinbefore described, a single, non-circular guide rod 36' or 36" may be utilized as respectively shown in FIGS. 9 and 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a method of making upper and lower dental study models adapted to be positioned in occlusion with each other by contact with a wax bite, and wherein said models are independently cast between respective impression holding trays and a common former having a base molding cavity dimensioned for minimal trimming of the base portions of the study models, the steps of: initially casting one of the study models in the common former; positioning one of the impression holding trays, corresponding to the other of the study models to be subsequently cast, over the initially cast study model in an aligned position; recording the aligned position of said one of the trays on an alignment guide; removing the initially cast study model from the common former; and then casting said other of the study models between said common former and said one of the trays while holding thereof in alignment with the recorded position on the alignment guide.

2. The method as defined in claim 1 wherein the step of initially casting one of the models includes: establishing a line of symmetry on the tray intersecting at least two anatomical landmarks in the tray holding impression corresponding to the initially cast model; and aligning said symmetry line with centering marks on the common former.

3. The method as defined in claim 2 wherein the step of positioning said one of the trays in aligned relation to the initially cast model, includes: placing the wax bite in occlusal contact with the initially cast model; marking in the wax bite and the impression associated with said one of the trays for alignment with each other.

4. The method as defined in claim 3 wherein the step of recording the aligned position of said one of the trays includes: guidingly positioning the alignment guide in contact with said one of the trays in the aligned position; and tracing an outline of said one of the trays on the alignment guide.

5. The method of claim 1 wherein the step of positioning said one of the trays in aligned relation to the initially cast model, includes: placing the wax bite in occlusal contact with the initially cast model; marking in the wax bite; and the impression associated with said one of the trays for alignment with each other.

6. The method as defined in claim 1 wherein the step of recording the aligned position of said one of the trays includes: guidingly positioning the alignment guide in contact with said one of the trays in the aligned position; and tracing an outline of said one of the trays on the alignment guide.

7. In a method of making upper and lower dental study models adapted to be positioned in occlusion with each other by contact with a wax bite, and wherein said models are independently cast between respective impression holding trays and a common former having a base molding cavity dimensioned for minimal trimming of the base portions of the study model, the steps of: initially casting an upper one of the study model between the common former and one of the trays holding an upper impression symmetrically aligned therewith; positioning the other of the trays in inverted position above the initially cast model with a lower impression therein occlusally aligned with the initially cast model; recording the position of the other of the trays; removing the initially cast model from the common former; and then casting the lower of the study models between the common former and the other of the trays held in the recorded position.

8. A method of making occlusally related study models from a casting material, including the steps of: sequentially casting said models from impressions positioned relative to a common base molding cavity, said step of positioning one of said impressions including establishing a line of symmetry therethrough; and centrally aligning said line of symmetry with said molding cavity.

9. The method of claim 8 wherein the step of positioning the other of the impressions includes establishing an occlusal relationship between the initial cast model and the other of the impressions relative to the cavity; recording said occlusal relationship; and aligning the other of the impressions with the recorded occlusal relationship during subsequent casting of the other of the study models.

10. A method of making occlusally related study models from a casting material, including the steps of sequentially casting said models from impressions positioned relative to a common base molding cavity, said step of positioning one of the impressions including establishing an occlusal relationship between the initially cast model and said one of the impressions relative to the cavity; recording said occlusal relationship; and aligning said one of the impressions with the recorded occlusal relationship during subsequent casting of the other of the study models.

* * * * *